(No Model.)
R. McCONNELL.
PIPE COUPLING.
No. 290,446. Patented Dec. 18, 1883.
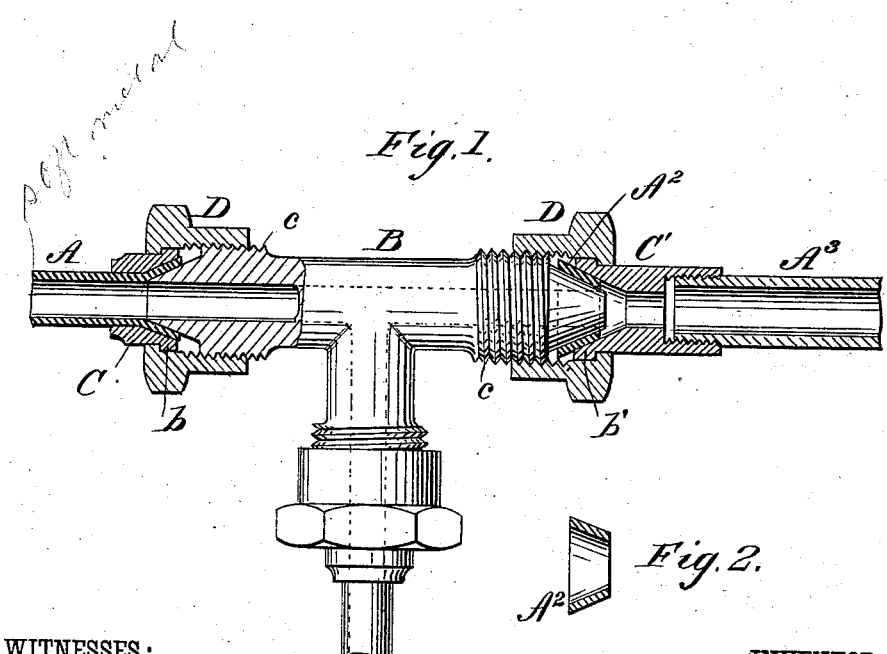
WITNESSES:
Donn Twitchell
C. Sedgwick
INVENTOR:
R. McConnell
BY Munn & Co
ATTORNEYS.

UNITED STATES PATENT OFFICE.

ROBERT McCONNELL, OF OMAHA, NEBRASKA.

PIPE-COUPLING.

SPECIFICATION forming part of Letters Patent No. 290,446, dated December 18, 1883.

Application filed January 15, 1883. (No model.)

*To all whom it may concern:*

Be it known that I, ROBERT McCONNELL, of Omaha, in the county of Douglas and State of Nebraska, have invented certain new and useful Improvements in Pipe-Couplings, of which the following is a full, clear, and exact description.

My invention relates to pipe-couplings; and it consists in the peculiar construction and arrangement of parts, as hereinafter more fully described, and pointed out in the claims.

Reference is to be had to the accompanying drawings, forming part of this specification, in which similar letters of reference indicate corresponding parts in all the figures.

Figure 1 is a partly-sectional longitudinal view of a T-coupling constructed in accordance with the invention, and shown as connecting pipes of different material together, including a hard-metal pipe with a soft-metal one; and Fig. 2 is a sectional view of a conical section of pipe of soft metal for use in making connections with hard-metal pipes.

In the drawings the T-shaped tube B is not only made externally conical or tapering outward at its ends, but the body of it, at the base of the cones or conical portions, is enlarged, and such enlarged parts provided each with an external screw-thread, $c$. The left-hand end of the tube B is represented as having connected with it a soft-metal piece of pipe, A, having a bell-mouthed or flaring end, which fits over said conical end of the tube, forming a packing of the same, and is pressed to a perfect joint internally and externally by such conical end or male cone of the tubular connection B and outer female cone formed by the collared thimble $C\,b$, which is drawn up and tightened by the flanged coupling-nut D, arranged to fit the screw-thread $c$. The opposite or right-hand end of the tubular connection B is similarly provided with a flanged coupling-nut, D, arranged to engage with an elongated collared thimble or tube, $C'\,b'$, and with the screw-thread $c$ on said end portion of the tube B, such thimble being constructed internally at its inner end to form a female cone, which, on screwing up the nut D, combines with the male cone on the end of the tube B to make a perfect joint by pressing internally and externally upon a short conical section of a pipe, $A^2$, that may be of soft metal arranged to fit over the end of the conical end of the tube B, and forming a packing of the same, as the flaring mouth of the pipe A on the opposite end of the tube B fits over its male cone. This construction of parts at the right-hand end of the tube B provides for the attachment at said end of an iron or other hard-metal pipe, $A^3$, bibcock, or stop-cock, for hose-coupling, which is screwed into the outer end of the elongated thimble $C'$. The joint, however, at said right-hand end of the tube B is established by male and female cones, with an interposed conical section of pipe in the same manner as the joint is made at the opposite end of the tube B.

Where only one soft-metal pipe A has to be connected by the conical-ended tube B with a hard-metal pipe, $A^3$, the side branch from said tube, as necessary for a T-coupling, and which may have combined with it the same connections as seen at the left hand of said figure, may be omitted.

Having thus described my invention, I claim as new and desire to secure by Letters Patent—

1. The combination, with a pipe-coupling tube having a conical end and an enlarged screw-threaded portion back of said conical end, of a collared thimble constructed to form a female cone, a packing between said cones, and a flanged coupling-nut, substantially as herein shown and described, and for the purpose set forth.

2. The combination, with the coupling-tube B, having a conical end, and provided with the threaded portion $c$, of the thimble $C'$, having collar $b'$, and constructed to form a female cone at its inner end, the conical compressible section of a pipe, $A^2$, and the flanged coupling-nut D, substantially as herein shown and described.

ROBERT McCONNELL.

Witnesses:
BYRON REED,
HARRY D. REED.